No. 773,416. PATENTED OCT. 25, 1904.
R. T. PISCICELLI.
ELECTRIC DESPATCH BOX FOR OVERHEAD LINES.
APPLICATION FILED JULY 3, 1903.
NO MODEL. 5 SHEETS—SHEET 1.
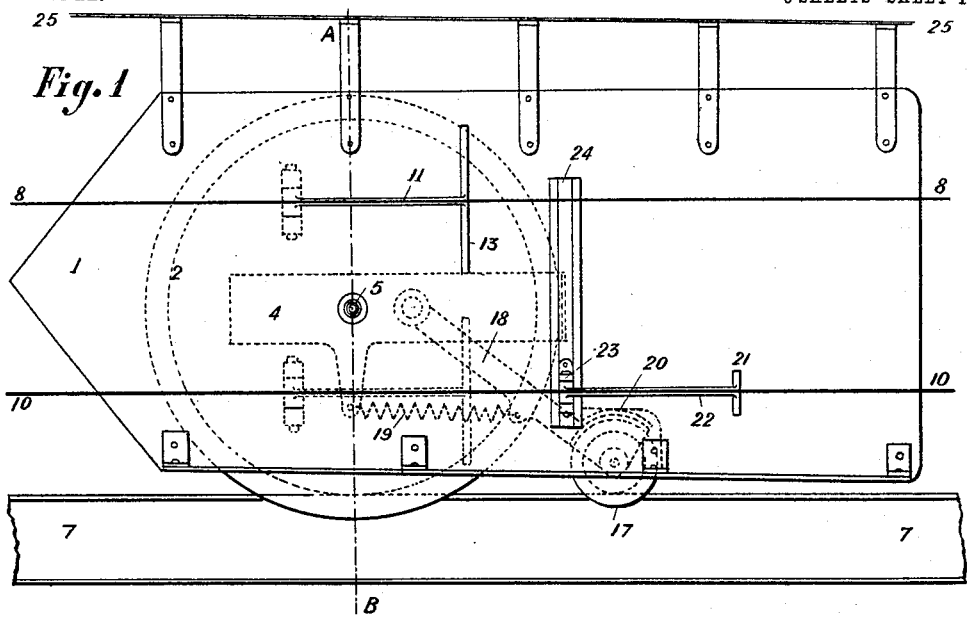
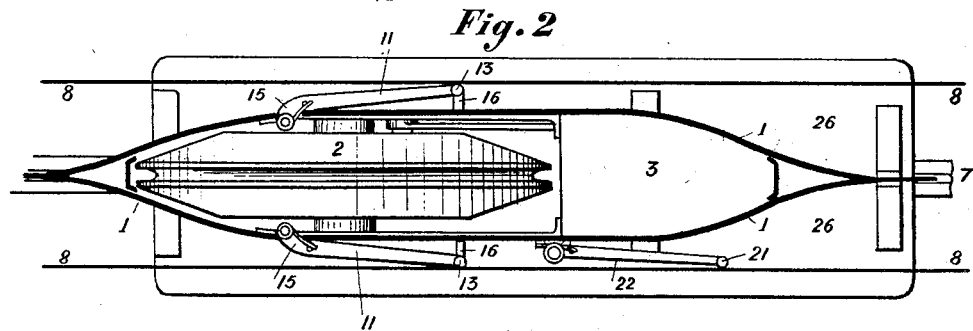
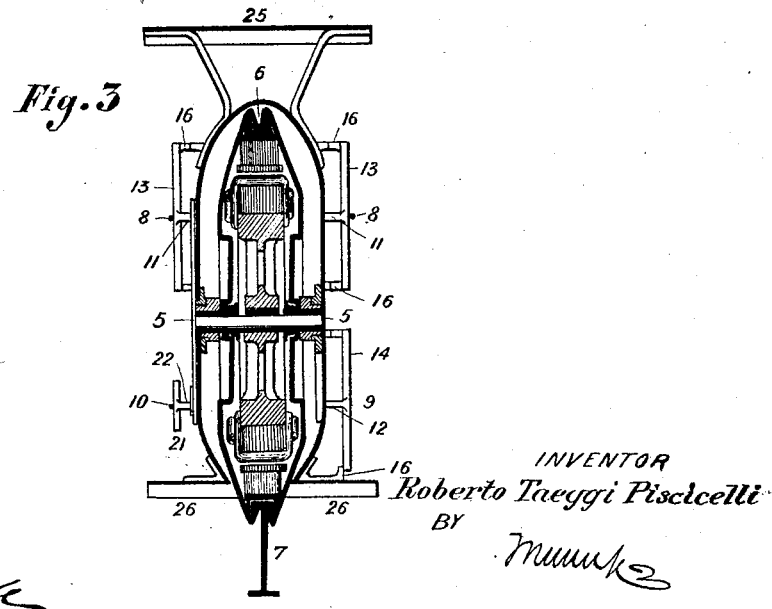
WITNESSES:
W. M. Avery
C. E. Holske
INVENTOR
Roberto Taeggi Piscicelli
BY
ATTORNEYS.

No. 773,416. PATENTED OCT. 25, 1904.
R. T. PISCICELLI.
ELECTRIC DESPATCH BOX FOR OVERHEAD LINES.
APPLICATION FILED JULY 3, 1903.
NO MODEL. 5 SHEETS—SHEET 2.

WITNESSES:
W. M. Avery
C. E. Holske

INVENTOR
Roberto Taeggi Piscicelli
BY
[signature]
ATTORNEYS.

No. 773,416. PATENTED OCT. 25, 1904.
R. T. PISCICELLI.
ELECTRIC DESPATCH BOX FOR OVERHEAD LINES.
APPLICATION FILED JULY 3, 1903.
NO MODEL. 5 SHEETS—SHEET 3.

WITNESSES:
W. M. Avery
A. E. Davis

INVENTOR
Roberto Taeggi Piscicelli
BY
ATTORNEYS.

No. 773,416. PATENTED OCT. 25, 1904.
R. T. PISCICELLI.
ELECTRIC DESPATCH BOX FOR OVERHEAD LINES.
APPLICATION FILED JULY 3, 1903.
NO MODEL. 5 SHEETS—SHEET 4.

WITNESSES:
W. M. Avery
A. H. Davis

INVENTOR
Roberto Taeggi Piscicelli
BY
ATTORNEYS.

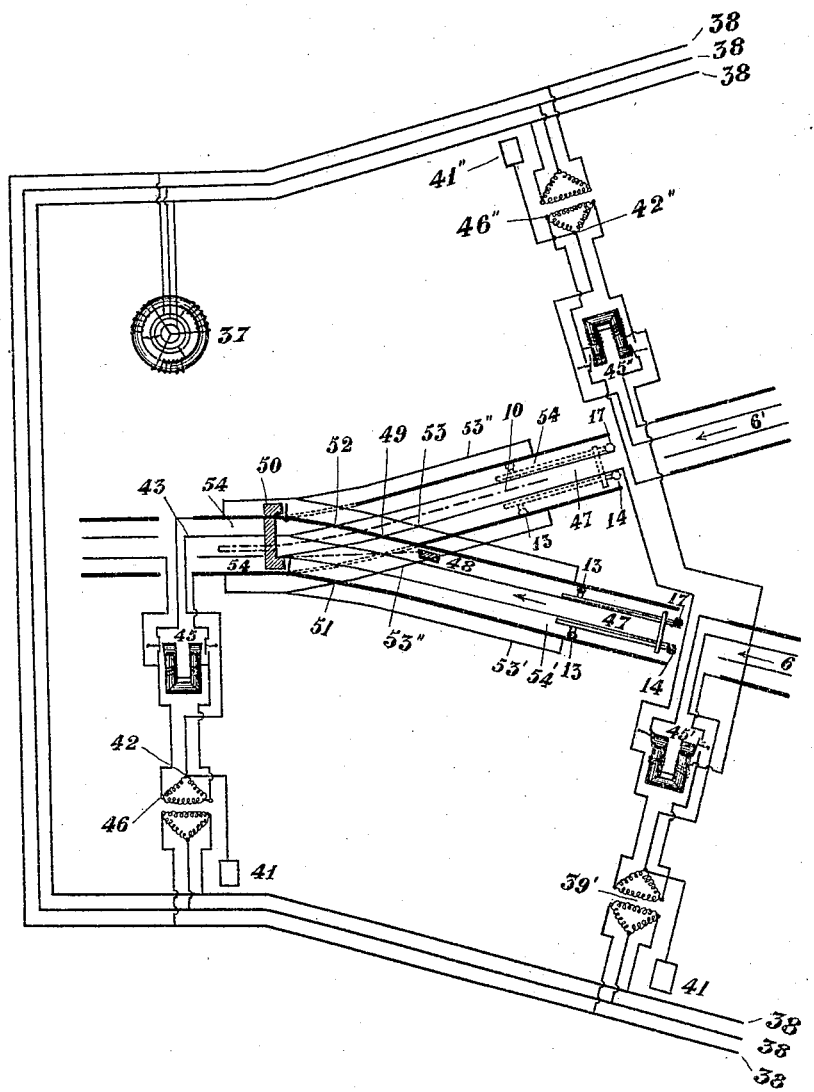

No. 773,416. Patented October 25, 1904.

UNITED STATES PATENT OFFICE.

ROBERTO TAEGGI PISCICELLI, OF NAPLES, ITALY.

ELECTRIC DESPATCH-BOX FOR OVERHEAD LINES.

SPECIFICATION forming part of Letters Patent No. 773,416, dated October 25, 1904.

Application filed July 3, 1903. Serial No. 164,250. (No model.)

*To all whom it may concern:*

Be it known that I, ROBERTO TAEGGI PISCICELLI, a subject of the King of Italy, and a resident of Naples, Italy, have invented certain new and useful Improvements in Electric Despatch-Boxes for Overhead Lines, of which the following is a full, clear, and exact description.

The present invention relates to some improvements in the construction of the despatch-boxes and of the overhead lines to be used in the system of electric mail-service described in the patent application, Serial No. 122,205, filed the 5th of October, 1902, which improvements are intended to diminish the resistance of the line and of the air to the translation movement of the despatch-boxes of the type described in the said specification, at the same time diminishing also the trepidations of the line.

Figure 8:
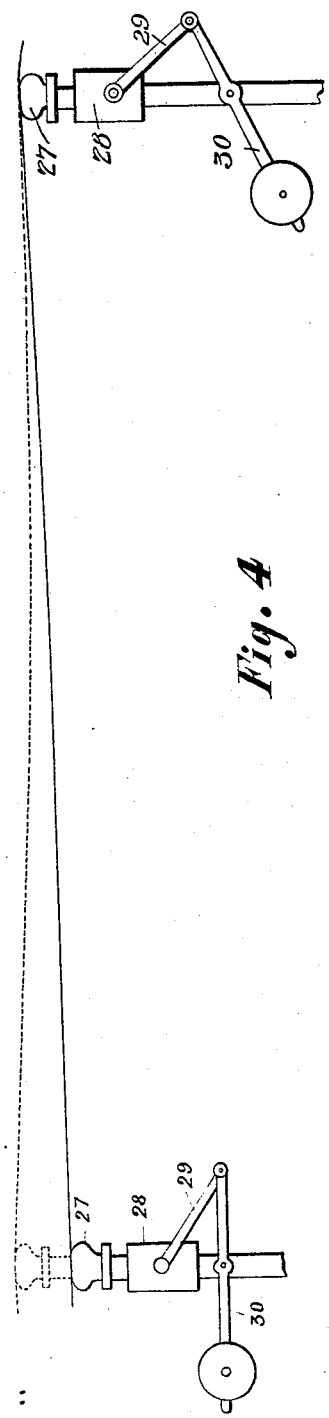
Figure 4:
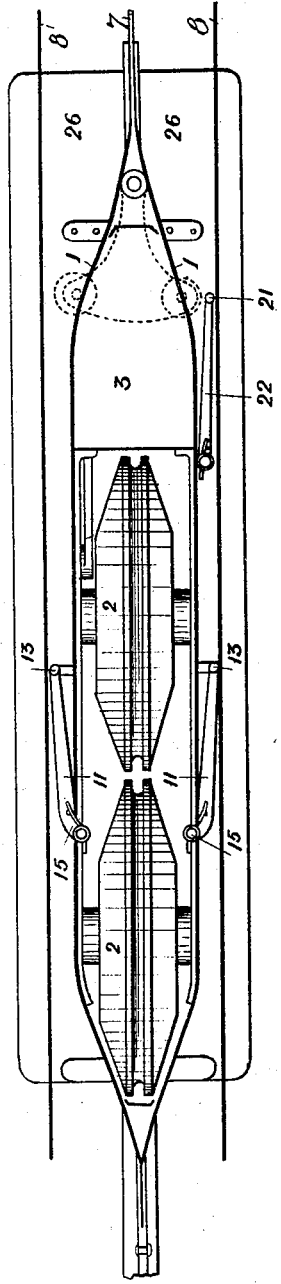
Figure 5:
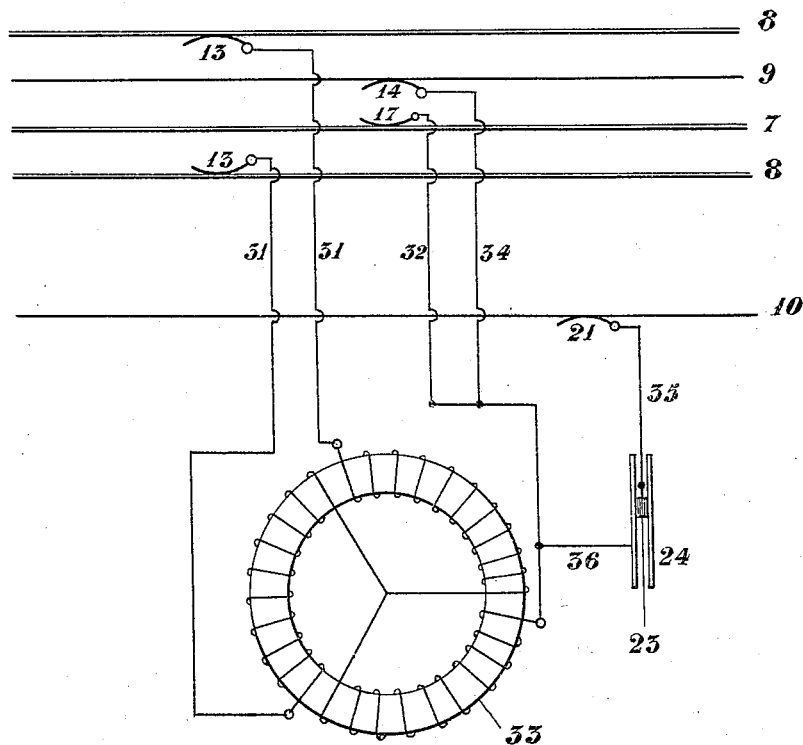
Figure 6:
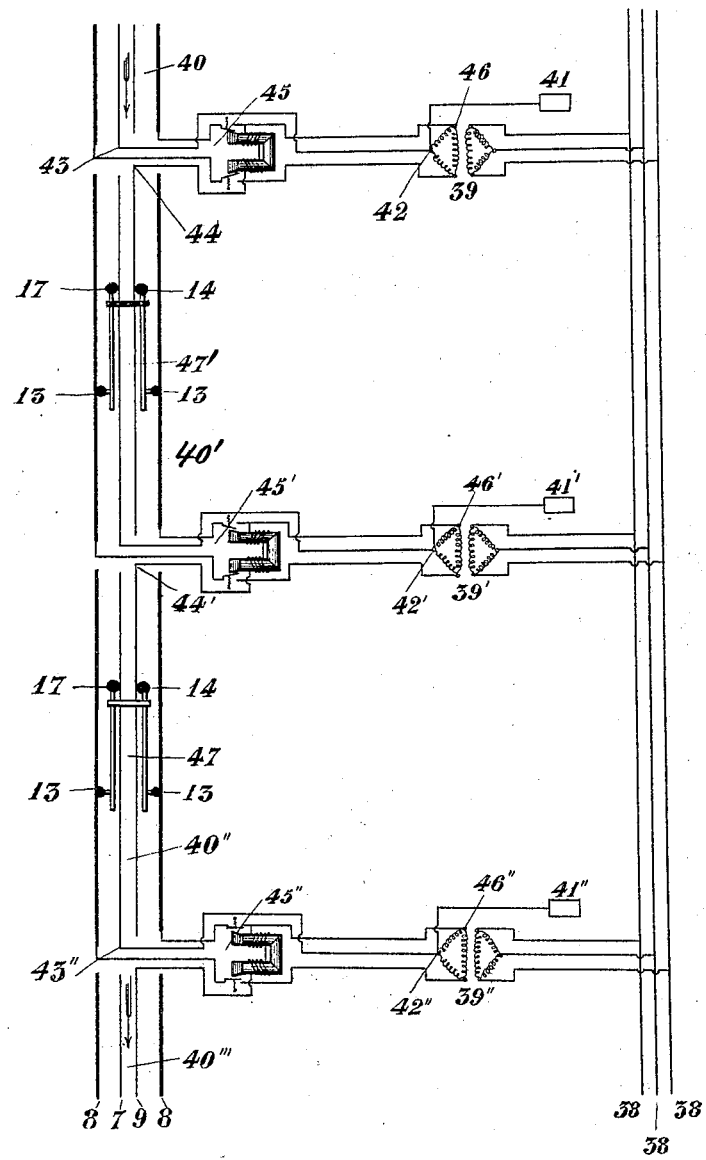

In the annexed drawings, Figures 1 and 2 show, respectively, a side elevation and a top view, while Fig. 3 is a sectional elevation, on the line A B of Fig. 1, of the improved despatch-box, which in Fig. 2 is shown without cover for the purpose of exhibiting the internal disposition. Fig. 4 represents a form of despatch-box to be used when considerable motive power is required. Fig. 5 represents schematically the connection of the motor with the conducting-wires of the line. Fig. 6 shows the arrangement of the block system for keeping two boxes at a distance from each other. Fig. 7 shows the arrangement of a switch. Fig. 8 represents schematically an improved form of construction of the aerial line.

The object of the improved form of box has been to reduce to a minimum the surface exposed to the impingement of the air by arranging the box immediately behind the motor and to diminish the resistance to the movement for a given cross-section of the box by giving the rear and front side of the box a wedged shape. Further, in order to smoothen the movement and avoid shocks the lines have been so arranged as to practically suppress the raised points where two successive catenaries cross themselves, and means have been provided by which the weight of the box on the line, and consequently the trepidations of the latter, are notably diminished.

Although the above said improvements are described hereinafter as applied to the despatch-boxes designed for the electric mail-service, it will be readily understood that many of them also may find application in other similar cases where electrically-propelled vehicles shall run at very high speed.

The despatch-box consists of a general casing 1, of thin metal sheet, the horizontal section of which closely approaches the section of a ship at the water-line in order to reduce to a minimum the resistance of the air. The motor 2 is arranged in the anterior of the casing and occupies its interior part, while the remaining part at the back of the motor forms the box proper, 3. The arrangement of the motor in the front end of the despatch-box is one of the main features of the present invention, because by such arrangement the rear end acting as a rudder will automatically reestablish at every deviation the axis of the box in the direction of the movement, preventing the lateral shocks of the rim against the head of the rail and insuring a steady direction.

The motor 2 is connected, by means of side bars 4, to the box proper, 3, intended for conveying the correspondence. On the side bars 4 is journaled the shaft 5 of the motor, to which is secured the inner drum of the motor forming the fixed part, (stator,) whereas the movable part (rotor) is formed by the outer rim 6, turning loose on the shaft 5.

The supporting cable or rail is only the lower one, 7, leading also a phase of current. The two upper wires, 8, lead the other two phases and serve only as a guide. The fourth wire, 9, serves for the control of the block, and finally near the switches the line is also provided with a fifth wire, 10, for the control of the switch-tongues. From the casing project laterally three swinging arms 11 11 12, which support three contact-rods 13 13 14, sliding against the wires 8 8 9 and maintained in contact with them by means of spiral springs 15. At their ends the contact-rods 13 13 14 are provided with projecting pieces 16, by means of which they rest against the side walls of the box when the latter being not in motion is supported laterally by the wires 8. After the starting the box remains in the vertical position in consequence of the rotation of the motor, as is the case with bicycle-wheels. From the lower cable or rail 7 the current is taken through the sheave 17, which is kept in contact with the rail by means of a swinging arm 18, drawn downwardly by a spiral spring 19. A metallic cap 20 covers the sheave 17, and on said cap rests the rear part of the box. The contact with the fifth wire, 10, is maintained also by means of a contact-rod 21, carried by an arm 22, which a spring causes to press laterally. However, the pivot of the arm 22 is carried by a block 23, sliding in a vertical groove 24, wherein it may be secured at any desired height.

When a considerable power is required, it is convenient to employ instead of one two or more motors arranged one behind the other, as illustrated in Fig. 4, as in such a way the power may be doubled or triplicated without the resistance of the air increasing in the least. Further, for the purpose of causing the box to stop on the interruption of the current the motor is supplied with a brake, whose shoes bear against the rotation rim as soon as the current is interrupted.

For the purpose of lightening the motor the windings are made of wires and rods of aluminium instead of copper. Further, in order to diminish the stress and the trepidations of the line on the passage of the box the latter has been furnished with a system of wings or inclined planes, against which the air impinges during the run and urges the box upward, partially discharging the line of its weight.

The figures show the despatch-box furnished with a wing or inclined plane 25, arranged over the box at a convenient height, and with two wings 26, arranged laterally in the same plane of the bottom of the box, which is also inclined for the purpose of utilizing its surface as wing-surface. Although the drawings show only three wings, it is obvious that many more wings may be applied to the box and arranged in any other suitable manner—as, for instance, at both sides of the box and at different heights or the one over the other over the box—and that they may consist of curved surfaces instead of the planes, if this is thought desirable. The total surface of the wings and their inclination will depend upon the weight to be discharged, whereby care must be taken to maintain the vertical pressure smaller than the total weight of the box in order to get the necessary adherence between the rim and the rail for the progression of the box. This residual weight, however, will be very small, and therefore the trepidations of the line will be by this arrangement considerably reduced. Finally, in order to prevent the violent shocks of the motor against the supports these may be made movable, as shown in Fig. 8.

According to the above-mentioned disposition the supporting-insulator 27 is carried by a sliding box 28, movable vertically and connected, by means of an articulated arm 29, to a counterweight-lever 30. The counterweight is regulated in such a way that when the line is clear the support is raised. As soon as the despatch-box has entered that portion of the line which precedes the support its weight begins to be appreciable and the support 27 lowers, causing at the same time the counterweight to rise. The wire when the line is clear takes the position shown by dotted lines, and while the box is passing over the left support, and this is consequently at the lower limit of its run, takes the position shown by full lines, from which it may be seen that the box is on the support at the lowest point of the catenary instead of impinging against an elevated point. After passing the support this rises again, while the counterweight of the lever 30 lowers, and the successive support begins to lower in its turn. Although the automatical blocking and switching mechanisms used in connection with the improved despatch-box, having already been claimed in my previous patent application, Serial No. 122,205, do not form part of the present invention, they are, however, described herein in order to better understand the operation of the various parts of the despatch-box.

As is clearly shown in Fig. 5, the current taken by means of the contact-rods 13 13 and the sheave 17 from the two upper wires 8 8 and the rail 7 arrives, through wires 31 31 32, arranged in the hollow shaft 5, to the fixed part 33 of the motor. Of course it is well understood that the wires 31 31 32, the contact-rods 13 13, and the sheave 17 are insulated from the casing 1 of the despatch-box and that the rim of the motor is insulated from the rail or supporting-cable 7 by means of india-rubber tire or other similar insulating substance placed on the bottom of the groove against which rests the rail 7. The fourth wire, 9, controlling, as above stated, the blocking device, is in permanent communication with the rail or third wire, 7, through the contact-rods 14 17 and the wires 32 34 when a despatch-box is running on the line. When the contact-rod 21 comes in contact with the fifth wire, 10, this latter is put also in communication with the third wire, 7, through the wire 35, the sliding block 23, the grooved guide 24, the wires 36 32, and the contact-rod 17. The high-potential current is supposed to be transmitted from the generating-station 37 by means of a "principal line," consisting of three wires 38. At convenient intervals the high-potential current is transformed by transformers 39, placed in transformer-cabins, to a low potential and transmitted to the aerial lines over which the despatch-boxes run. These lines are electrically interrupted at every transformer-cabin pole, and thereby form as many independent sections of the line, only fed by current when a motor bestrides the wires of the aerial way.

By examining Fig. 6, in which the arrows show the direction the vehicles run over the line, it will be also seen that each section is fed from a transformer-cabin ahead of it, so that a vehicle always receives current from the front. The blocking device is automatically controlled by each vehicle and has for its purpose to keep the successive despatch-boxes at a distance not less than that between two consecutive transformer-cabins.

The operation of this device is as follows: A despatch-box on section 40″ between two transformer-cabins will by its contact-rods 14 17 close the circuit (see Figs. 5 and 6) 41″, 42″, 43″, 17, 32, 34, 14, 44′, 45′, 46′, 42′, 41′, which is fed by a phase 46′ 42′ of the transformer 39′ in the cabin left behind by the despatch-box. This circuit is closed by the earth, because all the transformers are in communication with the earth. In the above circuit there is an electromagnet 45, which by attracting two armatures will cut out the two upper conductors 8 8 of sections 40′ fed by the transformer 39′. Consequently the section 40′ remains deprived of current during all that time the despatch-box 47 rests on a section 40″, and if another box 47′ arrives meantime over that section owing to its initial speed it will be compelled to stop for lack of current. In its turn box 47′, although stopping at 40′, by means of its contact-rods will cut the current out of section 40 and also prevent another despatch-box arriving there from running onto section 40′ and strike despatch-box 47′ at a standstill there. On vehicle 47 passing from section 40″ to 40‴ the circuit formerly closed by it will be broken, and the electromagnet 45′ will let the armatures free, which on being brought back by their springs to their former position will reëstablish the circuit of the two conductors feeding section 40′ from the transformer 45′, and consequently the vehicle 47′ at a standstill over section 40′ will immediately resume its course.

The main line has to be provided with switches wherever there is a branch, so as to open, according to requirement, the way a vehicle has to run. It is the vehicle itself that opens the switch when it has to leave the direct line, or vice versa. This result is obtained in the following manner: The movable part of each switch consists of three tongues (see Fig. 7) controlled from two electromagnets, one, 48, for moving the central tongue 49, the other, 50, the two parallel ones 51 52. The above two electromagnets when crossed by the current attract their armatures, which are connected with the tongues, and bring them in the position shown by dotted lines. When the current ceases, the tongues by means of their springs resume their stationary position, as shown. The windings of the two electromagnets are in series with the fifth wire, 10, situated at different heights at the various switches. Obviously the wire 10 needs only to cover a short section preceding the switch. As the sliding block 23 is fixed to a height to suit the level of the wire of the switch to be opened, the contact-rod 21 will pass freely over the wires of the preceding switches and only come in contact with the one on which it is to act. When the fifth wire comes in contact with this rod, it will establish, Figs. 5 and 7, a circuit 42, 43, 17, 32, 36, 24, 23, 21, 10, 50, 48, 53′, 54, 46, 42, by which a current is derived from the third wire, 7, and sent to the electromagnets 48 50, working the tongues of the switch. As it is desirable that the vehicles greatly slacken speed when passing a switch, the two upper wires are interrupted at points 54′ 54″ in order to cut the current in the lines immediately preceding the switch, whereby the vehicle will only run by its acquired velocity and gradually reduce its speed. The third conductor remains in action to complete the circuit working the switch-tongues and the circuit working the block-interrupters, as seen above. In order that the two sections—viz., those respectively preceding and following the insulated one—may be fed with current, it will be enough to join the ends 54 54′ 54″ of the two parts comprising the insulated conductors by means of two independent wires 53′ 53″, secured on a lower level to the poles supporting the parts electrically insulated.

I claim—

1. A despatch-box comprising two, or more, motors the outer rims of which act as driving-wheels, the motors being arranged the one behind the other, and a box for the correspondence having the same width as the motors and arranged behind them.

2. A despatch-box with two, or more, motors arranged the one behind the other and a general casing having the same width as the motors and wedge-shaped at both ends.

3. A despatch-box provided with wings arranged in any suitable manner to support the box during the run, substantially as and for the purpose described.

4. A despatch-box, provided with wings, the bottom of which is formed of an inclined plane, acting also as wing-surface.

5. A despatch-box comprising two, or more, motors arranged the one behind the other, a general casing wedge-shaped at both ends and wings arranged in any suitable manner to support the box during the run.

6. A despatch-box comprising a general casing wedge-shaped at both ends, wings arranged in any suitable manner to support the box during the run, and swinging arms projecting from the casing and provided with rollers or contact-rods running on the supply-wires, from which the current is led to the motors.

7. In despatch-boxes the combination of two or more motors arranged one behind the other, a general casing wedge-shaped at both ends, having the same width of the motors and fitted with wings supporting it in the run, swinging arms projecting from said casing and provided with rollers or contact-rods running along the supply-wires through which the current is supplied to the motors, a swinging arm with a roller or contact-rod controlling the block devices, and an arm with a roller or contact-rod, carried by a sliding block adjustable at any desired height for the control of the switches.

8. In despatch-boxes consisting of a general casing wedge-shaped at both ends, a motor the outer rim of which acts as driving-wheel, and a box proper having the same width of the motor, the arrangement of the motor in the anterior part of the casing as and for the purpose described.

9. An overhead line, for despatch-boxes, consisting of a lower rail supporting the total weight of the box and two upper wires between which the box runs, and adapted to hold the box upright when the latter is not in motion.

10. In the overhead lines for the traveling of the despatch-boxes, the movable supports controlled by counterweights lowering on the passage of the boxes and rising again, taking anew the normal position, after the passage of the boxes.

Signed by me at Naples, Italy, this 5th day of June, 1903.

ROBERTO TAEGGI PISCICELLI.

Witnesses:
LETTERIO LABSCOETTA,
LUIGI MORFINO.